United States Patent
Park

(10) Patent No.: US 7,164,345 B2
(45) Date of Patent: Jan. 16, 2007

(54) APPARATUS AND METHOD FOR REALIZING ALARM FUNCTION IN A CHARGING DEVICE FOR A MOBILE TERMINAL

(75) Inventor: Eung-Jin Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 99 days.

(21) Appl. No.: 10/782,169

(22) Filed: Feb. 19, 2004

(65) Prior Publication Data

US 2004/0227620 A1  Nov. 18, 2004

(30) Foreign Application Priority Data

Feb. 19, 2003  (KR) ...................... 10-2003-0010355

(51) Int. Cl.
*G08B 1/00* (2006.01)
(52) U.S. Cl. .............................. 340/309.16; 340/309.7; 340/309.8
(58) Field of Classification Search ...................... None
See application file for complete search history.

(56) References Cited

U.S. PATENT DOCUMENTS

| | | | | |
|---|---|---|---|---|
| 4,234,944 A | * | 11/1980 | Komaki et al. | 368/72 |
| 5,212,672 A | * | 5/1993 | Loisch et al. | 368/79 |
| 5,243,568 A | * | 9/1993 | Burch et al. | 368/73 |
| 5,469,133 A | * | 11/1995 | Hensler et al. | 340/407.1 |
| 5,802,467 A | * | 9/1998 | Salazar et al. | 455/420 |
| 6,226,536 B1 | * | 5/2001 | Miyashita | 455/567 |
| 6,236,622 B1 | * | 5/2001 | Blackman | 368/10 |
| 2003/0125075 A1 | * | 7/2003 | Klovborg | 455/556 |

* cited by examiner

*Primary Examiner*—Benjamin C. Lee
*Assistant Examiner*—Son Tang
(74) *Attorney, Agent, or Firm*—The Farrell Law Firm

(57) ABSTRACT

Disclosed is an apparatus for realizing an alarm function using a mobile terminal and a charging device for charging the mobile terminal. The mobile terminal includes a controller for generating an alarm control signal a predetermined time period ahead of a predetermined alarm time, and a first interface for transmitting the alarm control signal to the charging device. The charging device includes a second interface for receiving the alarm control signal from the mobile terminal, and a lamp driver for generating a lamp driving signal for controlling a lamp in response to the received alarm control signal.

13 Claims, 5 Drawing Sheets

APPARATUS AND METHOD FOR REALIZING ALARM FUNCTION IN A CHARGING DEVICE FOR A MOBILE TERMINAL

PRIORITY

This application claims priority under 35 U.S.C. § 119 to an application entitled "Apparatus and Method for Realizing Alarm Function in a Charging Device for a Mobile Terminal" filed in the Korean Industrial Property Office on Feb. 19, 2003 and assigned Serial No. 2003-10355, the contents of which are incorporated herein by reference.

BACKGROUND OF THE INVENTION

1. Field of the Invention

The present invention relates generally to the realization of an alarm function using a mobile terminal and a charging device for the mobile terminal, and in particular, to an apparatus and method for realizing a visual alarm function.

2. Description of the Related Art

A mobile terminal includes a battery pack for supplying electric power to the mobile terminal, and the battery pack is recharged using a charging device.

Recently, as many multifunctional electronic products are put on the market, there have been many demands for integrating various functions of the electronic products into one electronic product, for the sake of portability and utilization. However, most charging devices have only a charging function, being unable to meet such demands.

In general, a mobile terminal has an alarm function. The alarm function generates a predetermined sound through a speaker at a time previously set by a user, in order to inform the user of arrival of the set time. The alarm function is typically used as a morning call function. However, the sound alarm inconveniences the user, since he or she must turn on a lamp in the case of the night time, in order to respond to the alarm. In addition, the abrupt sound alarm and the light of the lamp may undesirably stress the user.

SUMMARY OF THE INVENTION

It is, therefore, an object of the present invention to provide a charging device for a mobile terminal, for realizing a visual alarm function.

It is another object of the present invention to provide a charging device with a visual alarm function for a mobile terminal, in which brightness of an alarm lamp is gradually adjustable.

To achieve the above and other objects, there is provided an apparatus for realizing an alarm function using a mobile terminal and a charging device for charging the mobile terminal. The mobile terminal includes a controller for generating an alarm control signal at a predetermined time period ahead of a predetermined alarm time, and a first interface for transmitting the alarm control signal to the charging device. The charging device includes a second interface for receiving the alarm control signal from the mobile terminal, and a lamp driver for generating a lamp driving signal for controlling a lamp in response to the received alarm control signal.

To achieve the above and other objects, there is provided a method for realizing an alarm function using a mobile terminal and a charging device for charging the mobile terminal. In the method, the mobile terminal generates an alarm control signal at a predetermined time period ahead of a predetermined alarm time, and transmits the alarm control signal to the charging device via a first interface. The charging device receives the alarm control signal from the mobile terminal via a second interface, and generates a lamp driving signal for controlling a lamp in response to the received alarm control signal.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Figure 1:
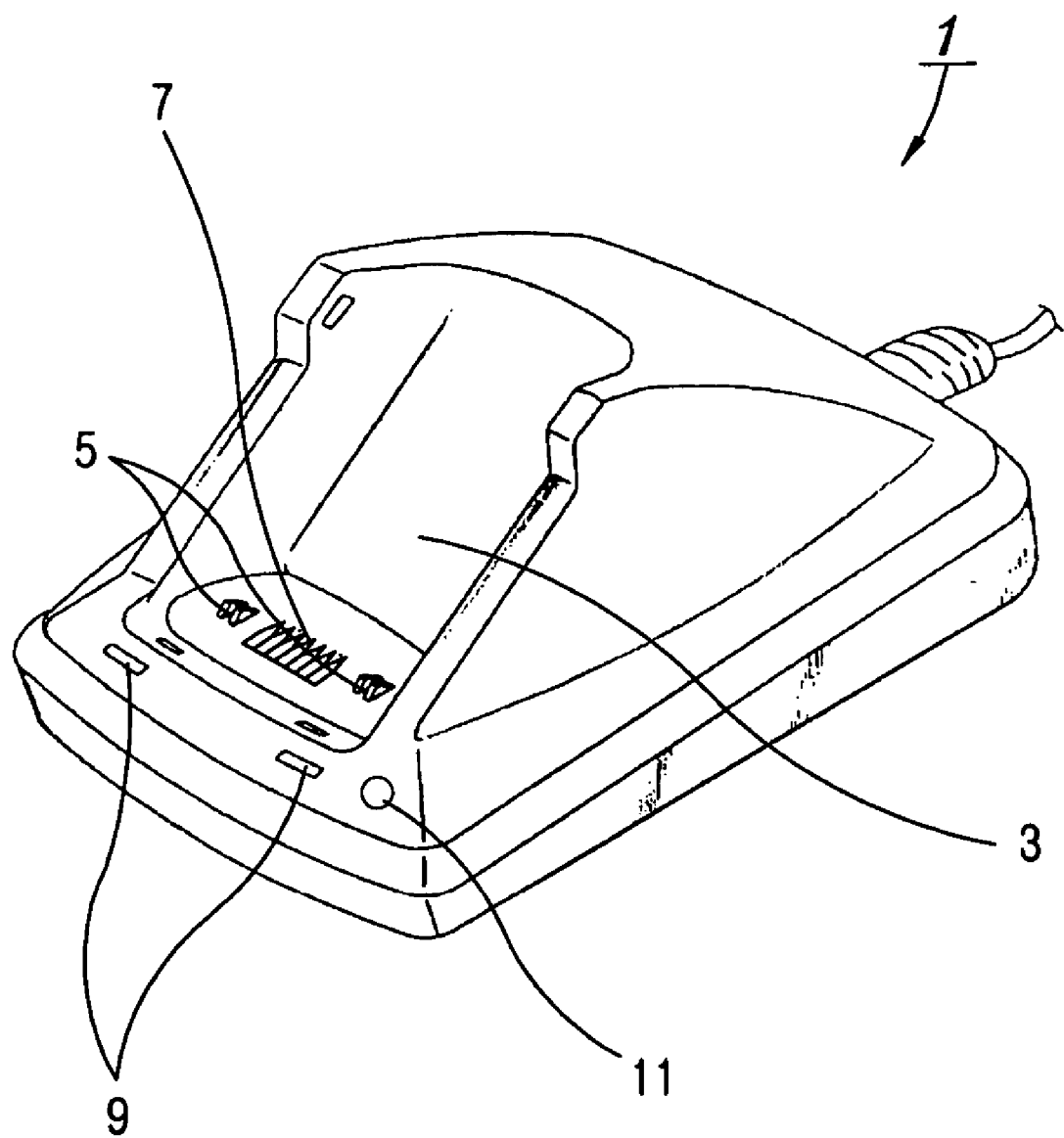
FIG. 1 illustrates a charging device according to a preferred embodiment of the present invention.

Several preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for conciseness.

FIG. 1 illustrates a charging device according to a preferred embodiment of the present invention. Referring to FIG. 1, a charging device 1 includes a cradle 3 on which a mobile terminal is put, and a pair of charging terminals 5 formed on the cradle 3. The charging terminals 5 electrically contact with associated charging terminals of the mobile terminal so as to charge a battery pack for the mobile terminal. Further, the cradle 3 includes an interface jack 7. The interface jack 7 is electrically connected to an associated interface connector of the mobile terminal, in order to receive an alarm control signal output from the mobile terminal. For the interface jack 7, an 8 or 16-pin data link cable for data transmission is typically used.

In addition, the charging device 1 includes charging state indication lamps 9 for indicating a charging state of the mobile terminal being charged, and an alarm lamp 11 for giving a visual alarm. The alarm lamp 11 has a size small enough to be mounted on the charging device 1, and has brightness that can be perceived by the user. Although a halogen lamp is typically used as the alarm lamp 11, other lamps that satisfy the conditions stated above can also be used.

Figure 2:
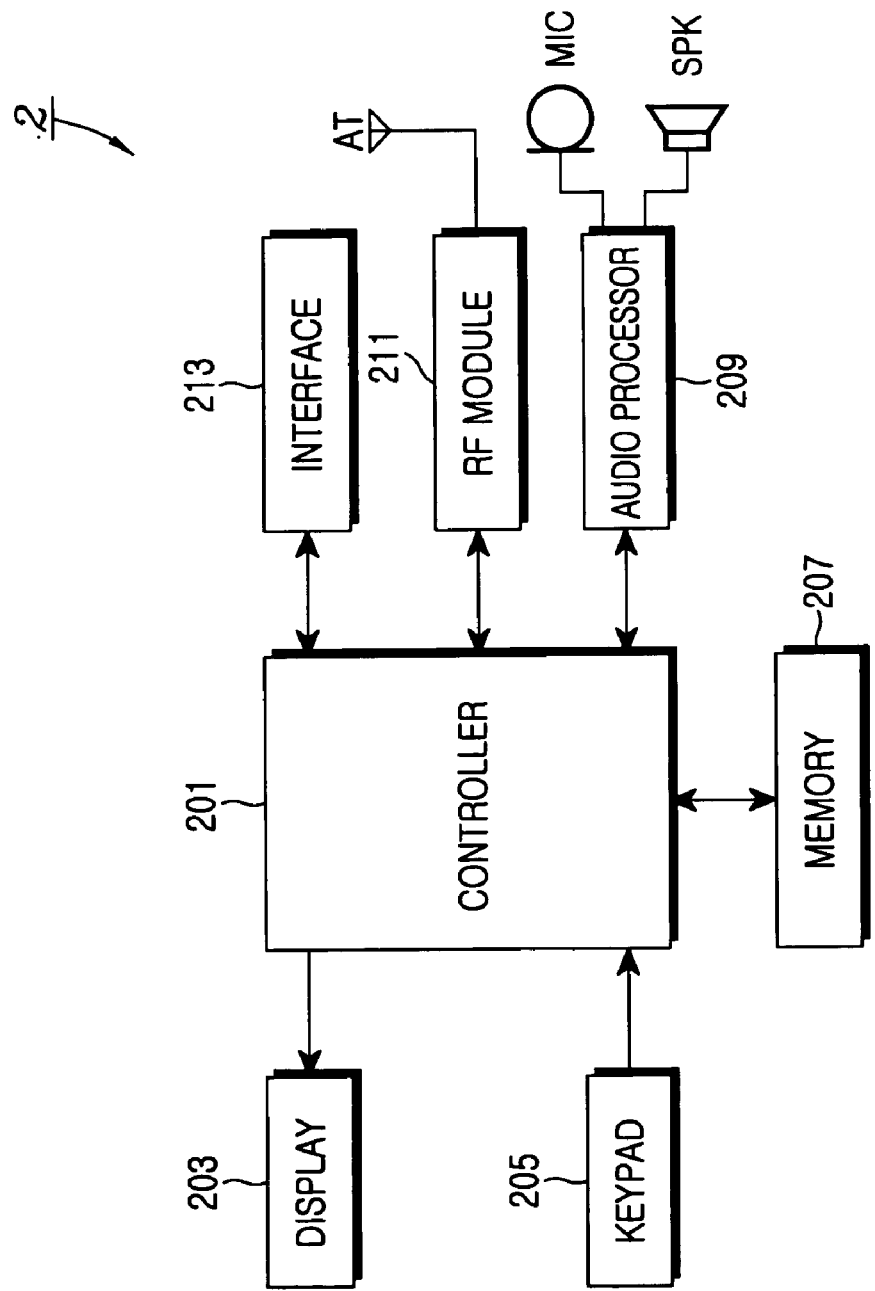
FIG. 2 is a block diagram of a mobile terminal according to a preferred embodiment of the present invention.

FIG. 2 is a block diagram of a mobile terminal according to a preferred embodiment of the present invention. Referring to FIG. 2, a mobile terminal 2 includes a controller 201, a display 203, a keypad 205, a memory 207, an audio processor 209, an RF (Radio Frequency) module 211, and an interface 213.

The controller 201 controls the overall operation of the mobile terminal 2. In particular, according to the present invention, the controller 201 generates the alarm control signal at an alarm time set by the user. The RF module 211, under the control of the controller 201, demodulates a radio signal including audio data and control data, received from an antenna (AT), and modulates a transmission signal to be transmitted through the antenna. The audio processor 209, under the control of the controller 201, converts audio data received from the RF module 211 into an audible sound through a speaker (SPK), converts an audio signal received from a microphone (MIC) into digital audio data, and provides the digital audio data to the RF module 211. Particularly, in the invention, the audio processor 209 can generate an audible alarm signal through the speaker at an alarm time set by the user.

The keypad 205 includes a plurality of numerical keys and function keys, and provides the controller 201 with key input data corresponding to a key input by the user. The display 203 displays various messages under the control of the controller 201. The memory 207 stores program data required to control an operation of the mobile terminal 2, and also stores data generated during the control or generated by the user. Particularly, in the invention, the memory 207 stores the alarm time set by the user, time information for driving a visual alarm, and time information for ending the visual alarm. The interface 213 includes an interface connector (not shown) for connecting to the interface jack 7 of the charging device 1, and provides the charging device 1 with the alarm control signal generated by the controller 201. The interface 213 can be realized with a GPIO (General Purpose Input/Output) port.

Figure 3:
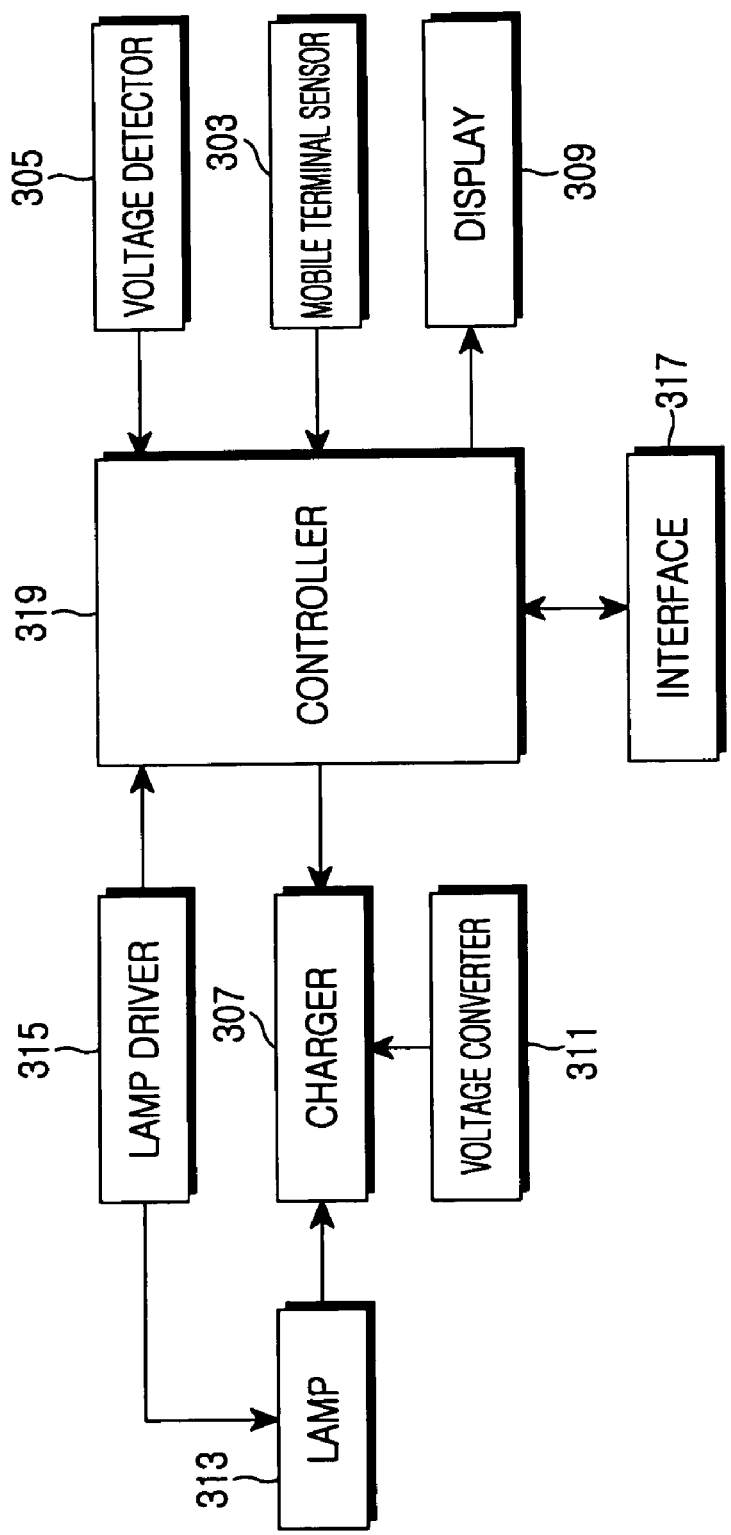
FIG. 3 is a block diagram illustrating the charging device of FIG. 1 according to a preferred embodiment of the present invention.

FIG. 3 is a block diagram illustrating the charging device of FIG. 1 according to a preferred embodiment of the present invention. Referring to FIG. 3, a mobile terminal sensor 303 determines whether the mobile terminal 2 is put on the cradle 3 of the charging device 1, and a voltage detector 305 detects a voltage currently charged in a battery pack for the mobile terminal 2. A voltage converter 311 converts an input AC (Alternating Current) voltage into a DC (Direct Current) voltage for driving a controller 319. A charger 307, under the control of the controller 319, converts the DC voltage output from the voltage converter 311 into a charging voltage, and charges a battery pack for the mobile terminal 2 with the charging voltage.

The controller 319 controls the overall operation of the charging device 1, and controls charging of the battery pack for the mobile terminal 2 by comparing a voltage detected by the voltage detector 305 with a preset voltage. A display 309, under the control of the controller 319, informs the user whether the charging operation is completed, through the charging state indication lamps 9. An interface 317 includes the interface jack 7 for connecting to an associated interface connector of the mobile terminal 2, and receives the alarm control signal provided from the mobile terminal 2.

A lamp driver 315 drives an alarm lamp 313 in response to the received alarm control signal, under the control of the controller 319. The lamp driver 315 will preferably gradually increase brightness of the alarm lamp 313 by controlling electric power supplied to the alarm lamp 313, each time the alarm control signal is received from the interface 317. A variable resistor or a triac (not shown) can be used to control the electric power supplied to the alarm lamp 313.

Figure 4:
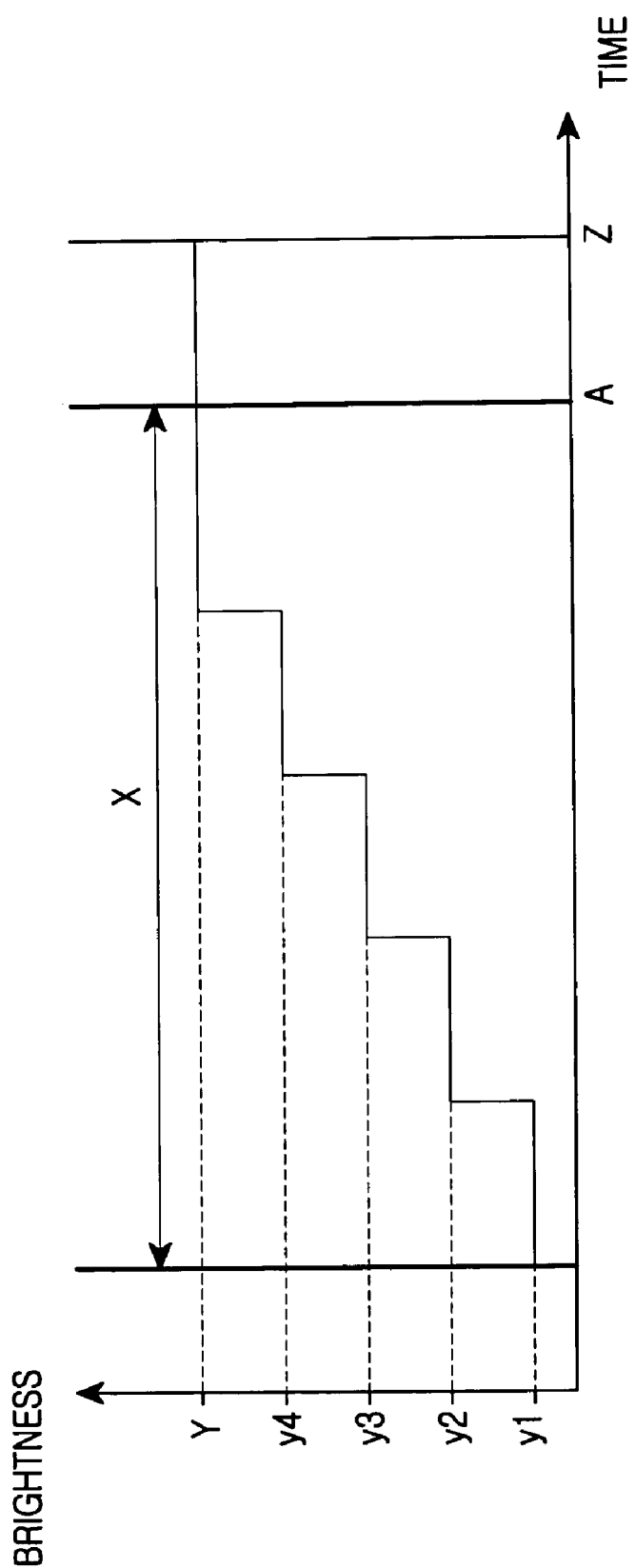
FIG. 4 is a graph illustrating an alarm lamp driving signal according to a preferred embodiment of the present invention.

FIG. 4 is a graph illustrating an alarm lamp driving signal according to a preferred embodiment of the present invention. In the graph, "A" represents a predetermined alarm time set by the user, and "X" represents a predetermined time period when a visual alarm, i.e. the alarm lamp 313, is driven in advance of the alarm time A. As a result, the alarm lamp 313 is turned on for the time period X. In the present invention, the visual alarm is turned on at the time period X ahead of the alarm time A set by the user. In addition, "Y" represents a brightness level of the alarm lamp 313. In the graph, the brightness level Y of the alarm lamp 313 is divided into 5 steps. Further, "Z" represents a visual alarm end time where the alarm lamp 313 is turned off. The values X, Y and Z may be previously set by the user. Alternatively, they can be previously set in the mobile terminal 2 by a manufacturer.

Figure 5:
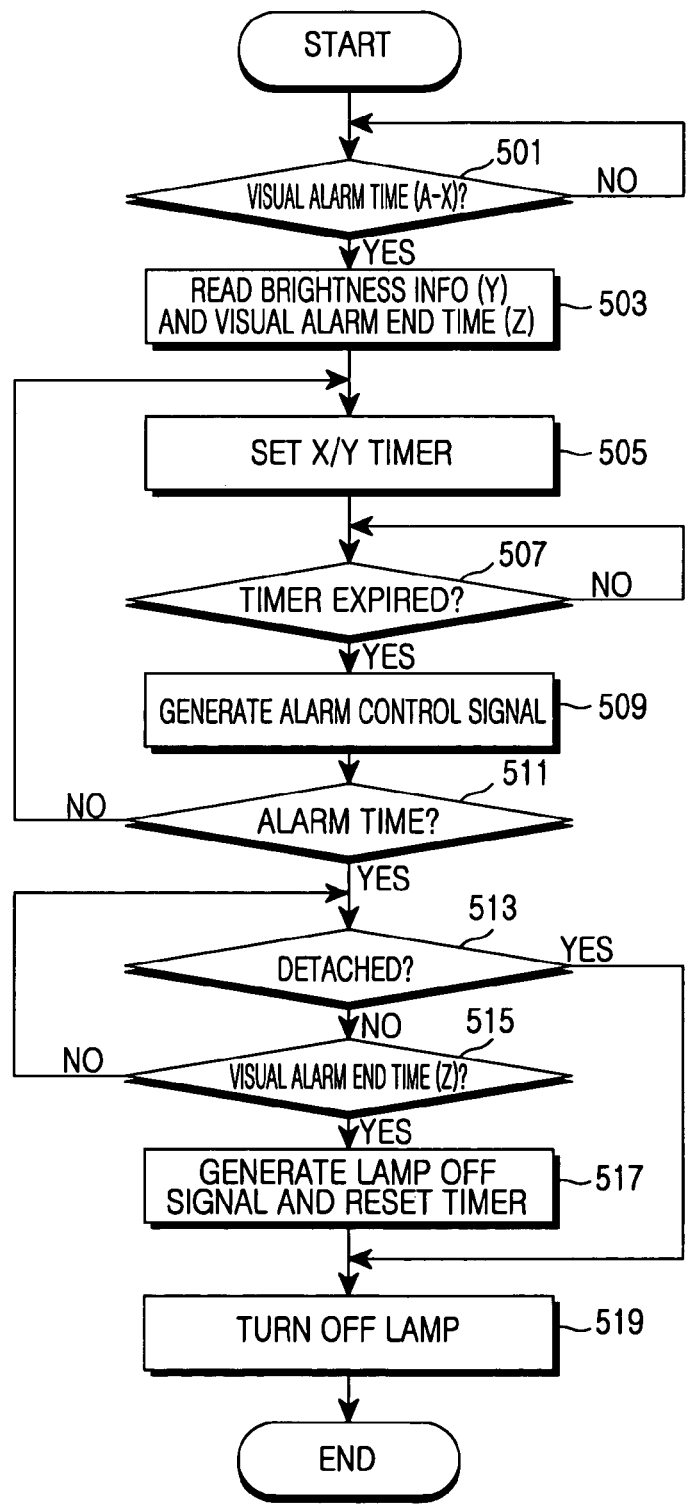
FIG. 5 is a flowchart illustrating a procedure for performing a visual alarm function according to a preferred embodiment of the present invention.

FIG. 5 is a flowchart illustrating a procedure for performing a visual alarm function according to a preferred embodiment of the present invention. A method for performing a visual alarm function using the mobile terminal 2 and the charging device 1 for the mobile terminal 2 will now be described with reference to FIGS. 2 to 5.

If a user desires to set the visual alarm function, the controller 201 of the mobile terminal 2 stores an alarm time A input by the user through the keypad 205 in the memory 207. In addition, the controller 201 stores in the memory 207 the visual alarm time period X set by the user or manufacturer, the brightness information Y of the alarm lamp 313, and the visual alarm end time Z.

If a visual alarm mode is set by the user, the controller 201 reads in step 501 the alarm time A and the visual alarm time period X from the memory 207, and determines whether a current time is identical to a visual alarm start time (A–X). If the current time is identical to the visual alarm start time, the controller 201 proceeds to step 503. Otherwise, if the current time has not arrived at the visual alarm start time, the controller 201 returns to the beginning of the procedure.

In step 503, the controller 201 reads the brightness information Y and the visual alarm end time Z from the memory 207, and calculates a time period for which a timer (not shown) is to be driven. The brightness information Y for a visual alarm preferably has a plurality of brightness steps y1, y2, y3, . . . for the visual alarm, and the number of brightness steps can be set by the user. For example, in FIG. 4, the 5 brightness steps are set. The timer is driven to repeatedly generate an alarm control signal at a predetermined interval. In the embodiment of the present invention, the alarm control signal is generated at an interval determined by dividing the visual alarm time period X by the visual alarm brightness Y information (i.e. X/Y). The controller 201 sets the driving time period of the timer to the time period X/Y so that the timer expires at intervals of the time period X/Y.

In step 505, the controller 201 drives the timer, and then proceeds to step 507. In step 507, the controller 201 determines whether the timer has expired, i.e., whether the time period X/Y has elapsed. If the timer has expired, the controller 201 proceeds to step 509. In step 509, the controller 201 generates an alarm control signal, and provides the generated alarm control signal to the charging device 1 via the interface 213. Upon receiving the alarm control signal via the interface 317, the controller 319 of the charging device 1 enables the lamp driver 315 to turn on the alarm lamp 313, initially in the lowest brightness step.

In step 511, the controller 201 of the mobile terminal 2 determines whether the current time has arrived at the alarm time A. If the current time has not yet arrived at the alarm time A, the controller 201 returns to step 505 and drives the timer. In this case, the controller 201 provides the charging device 1 with the alarm control signal at intervals of the time period X/Y by repeating the process of steps 505 to 511, until the current time arrives at the alarm time A. Each time the alarm control signal is received, the controller 319 of the charging device 1 enables the lamp driver 315 to increase the brightness of the alarm lamp 313, step by step.

In the meantime, if the current time has arrived at the alarm time A, the controller 210 of the mobile terminal 2 preferably outputs an audio alarm signal to the speaker through the audio processor 209, and then proceeds to step 513. At the moment, the mobile terminal sensor 303 of the charging device 1 determines whether the mobile terminal 2 is on the cradle 3 of the charging device 1. If the mobile terminal 2 is detached (or lifted up) from the charging device 1, the mobile terminal sensor 303 provides a signal indicating detachment of the mobile terminal 2 to the controller 319 of the charging device 1, and then proceeds to step 519.

In step 519, the controller 319 of the charging device 1 turns off the alarm lamp 313 by enabling the lamp driver 315 upon receiving the detachment signal of the mobile terminal 2. If the mobile terminal 2 is detached from the charging device 1, the controller 319, will generate a mobile terminal detachment signal and release the visual alarm function by the charging device 1, instead of proceeding to step 519. If the visual alarm function is released, the alarm lamp 313 can be either continuously turned on or turned off by the controller 319 of the charging device 1.

Although the present invention has been described only for the case where the mobile terminal sensor 303 determines whether the mobile terminal is detached from the charging device 1 after the alarm time, it will be understood by those skilled in the art that it is also possible to turn off the alarm lamp 313 or release the visual alarm function if the mobile terminal 2 is detached from the charging device 1, even if the mobile terminal 2 is detached before the alarm time.

If it is determined in step 513 that the mobile terminal 2 is not detached from the charging device 1, the controller 201 of the mobile terminal 2 determines in step 515 whether the current time is identical to the visual alarm end time Z. If the current time has not yet arrived at the visual alarm end time Z, the controller 210 of the mobile terminal 2 returns to step 513. Otherwise, if the current time has arrived at the visual alarm end time Z, the controller 201 proceeds to step 517. In step 517, the controller 210 stops and resets the timer, generates a lamp off control signal for turning off the alarm lamp 313, and transmits the lamp off control signal to the charging device 1 via the interface 213. Upon receiving the alarm lamp off control signal via the interface 317 or receiving the mobile terminal detachment signal from the mobile terminal sensor 303, the controller 319 of the charging device 1 disables the lamp driver 315 and turns off the alarm lamp 313.

As can be understood from the foregoing description, the present invention realizes a visual alarm function in a charging device for a mobile terminal, thereby contributing to a decrease in stress that the user may suffer due to an abrupt sound alarm. In addition, the present invention adjusts brightness of a visual alarm step by step, inducing the user to wake up refreshingly.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An apparatus for realizing an alarm function using a mobile terminal and a charging device for charging the mobile terminal, the apparatus comprising:
    a mobile terminal controller for generating an alarm control signal at a predetermined time period ahead of a predetermined alarm time, and for generating a lamp off signal after a lapse of the predetermined time period;
    a mobile terminal interface for transmitting the alarm control signal and the lamp off signal to the charging device;
    a charging device interface for receiving the alarm control signal and the lamp off signal from the mobile terminal; and
    a lamp driver for generating a lamp driving signal for controlling a lamp in on and off states, in response to the received alarm control signal and the lamp off signal, respectively.

2. The apparatus of claim 1, wherein the alarm control signal is repeatedly generated at predetermined intervals.

3. The apparatus of claim 2, wherein the lamp driver increases electric power supplied to the lamp, each time the repeatedly generated alarm control signal is received.

4. The apparatus of claim 1, wherein the alarm control signal is repeatedly generated at a predetermined interval.

5. The apparatus of claim 1, further comprising:
    a mobile terminal sensor for determining whether the mobile terminal is detached from the charging device, and generating a mobile terminal detachment signal if the mobile terminal is detached from the charging device; wherein
    the lamp driver turns off the lamp in response to the mobile terminal detachment signal from the mobile terminal sensor.

6. The apparatus of claim 1, wherein an audio alarm is provided at the predetermined alarm time.

7. A method for realizing an alarm function using a mobile terminal and a charging device for charging the mobile terminal, the method comprising the steps of:
    generating by the mobile terminal an alarm control signal at a predetermined time period ahead of a predetermined alarm time, and a lamp off signal after a lapse of the predetermined time period;
    transmitting by the mobile terminal the alarm control signal and the lamp off signal to the charging device via a mobile terminal interface;
    receiving by the charging device the alarm control signal and the lamp off signal from the mobile terminal via a charging device interface; and
    generating by the charging device a lamp driving signal for controlling a lamp in on and off states, in response to the received alarm control signal and lamp off signal, respectively.

8. The method of claim 7, wherein the alarm control signal is repeatedly generated at predetermined intervals.

9. The method of claim 8, wherein the charging device increases electric power supplied to the lamp, each time the repeatedly generated alarm control signal is received.

10. The method of claim 7, wherein the alarm control signal is repeatedly generated at a predetermined interval.

11. The method of claim 7, further comprising:
    determining by the charging device whether the mobile terminal is detached from the charging device;

generating a mobile terminal detachment signal if the mobile terminal is detached from the charging device; and turning off the lamp in response to the mobile terminal detachment signal.

12. The method of claim 7, further comprising:

providing an audio alarm at the predetermined alarm time.

13. An apparatus for realizing an alarm function using a mobile terminal and a charging device for charging the mobile terminal, the apparatus comprising:

a mobile terminal controller for generating an alarm control signal at a predetermined time, and for generating a lamp off signal after a lapse of a predetermined time period ahead of the predetermined time;

a mobile terminal interface for transmitting the alarm control signal and the lamp off signal to the charging device;

a charging device interface for receiving the alarm control signal and the lamp off signal from the mobile terminal;

a lamp for providing a visual alarm;

a lamp driver for generating a lamp driving signal for controlling the lamp in on and off states, in response to the received alarm control signal and the lamp off signal, respectively; and a speaker for providing an audio alarm at a predetermined alarm time after the predetermined time.

* * * * *